Feb. 23, 1932.  C. H. DESAUTELS  1,846,048
MACHINE FOR TESTING PLASTICS
Filed April 24, 1929
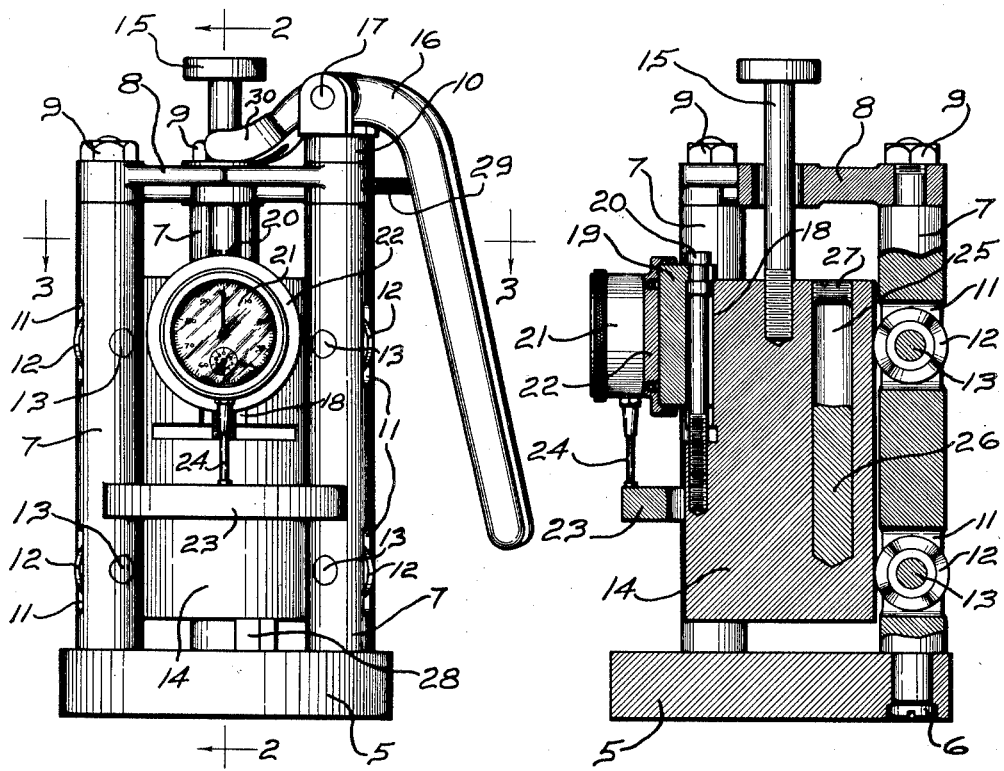
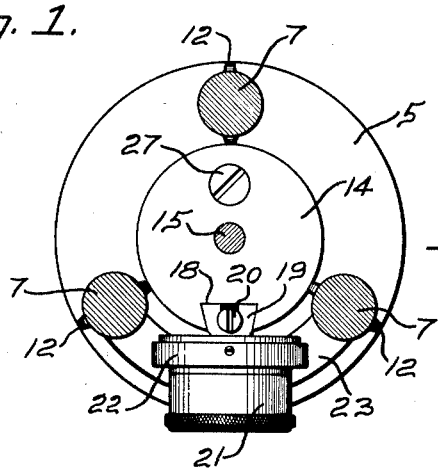
INVENTOR.
Charles H. Desautels.
BY
ATTORNEY.

Patented Feb. 23, 1932

1,846,048

UNITED STATES PATENT OFFICE

CHARLES H. DESAUTELS, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS

MACHINE FOR TESTING PLASTICS

Application filed April 24, 1929. Serial No. 357,616.

My invention relates to machines for determining the density, resiliency and permanent set of plastic materials and more particularly of rubber compounds.

An object of my invention is to provide a machine which will maintain a fixed pressure on the test sample regardless of how much the latter is depressed. Another object is to provide a machine of this character in which the weight or pressure applying member is substantially full floating thus compensating for any torsional stresses in the test sample. Still further objects will be apparent from the following specification and claim.

In the drawings, which illustrate one embodiment of my invention,

Fig. 1 is a view showing the front elevation of the machine;

Fig. 2 is a sectional view taken on line 2—2 of Fig. 1; and

Fig. 3 is a sectional view taken on line 3—3 of Fig. 1.

In the drawings, 5 represents a base to which is secured, by bolts 6, three round posts 7 which are in turn rigidly bolted to a spacing spider 8 by nuts 9 and a special nut 10. The round posts 7 are slotted at 11 to receive beveled rollers 12 which are rotatably mounted on pins 13 journaled in the posts 7. Slidably positioned between these rollers 12, as best shown in Fig. 3, is a cylinder 14 in which is secured a stud bolt 15 extending, as shown in Fig. 2, through the spider 8. A hand lever 16 is pivotally secured to the special nut 10 at 17 and is held normally in the position shown in Fig. 1 by a compression spring 29. The forked portion 30 of the lever 16 is adapted to engage the underside of the head of the stud bolt 15 so that by pivoting the lever 16 the cylinder 14 may be raised or lowered in respect to the base 5. Formed in the cylinder 14 (Figs. 2 and 3) is a slot 18 in which is positioned a slide 19 adapted to be adjustably positioned in the slot 18 by an adjusting screw 20 threaded into the cylinder 14. A suitable gauge 21 is rigidly mounted to the slide, as shown in Fig. 2, by an adapter 22. An arc-shaped member 23 is secured to the two front posts 7 (Fig. 1) and is positioned so as to engage a spring-pressed plunger 24 of the gauge 21. It can be readily seen from the foregoing that as the cylinder 14 is raised or lowered its degree of movement will be registered by the gauge 21.

The combined weight of the cylinder 14, stud bolt 15, slide 19, adjusting screw 20, adapter 22 and gauge 21 must be known as this quantity is used in the testing computations and for ease in calculation it should be in round numbers. To accomplish this I have provided a hole 25 in the cylinder 14 in which substances 26 may be inserted to bring the weight to the desired amount and then the hole may be sealed by a plug 27.

The operation of the machine is as follows: A spacing block 28 is inserted between the cylinder 14 and the base 5 and the reading on the gauge is noted. A sample of known dimensions, one of which corresponds to the spacing block, is then placed between the cylinder 14 and the base 5 and the spacing block is then removed. After a predetermined time a second reading is taken and the difference between the first and second readings is equal to the degree that the sample has been compressed. This figure is then used in the customary computations to determine the various properties of the sample.

An important feature of my invention as illustrated in the drawings is that when the sample is being compressed by the cylinder 14 the latter is free to be rotated on its vertical axis should any appreciable torsional stress exist in the sample. This rotation of the cylinder will not affect the readings of the gauge 21 as the surface of the member 23, on which the plunger 24 of the gauge 21 engages, is parallel to the surface of the base 5 and the bottom surface of the cylinder 14.

Having thus described my invention, I claim:

A device of the character described which comprises a base adapted to receive the sample to be tested, vertical guide rods rigidly secured to the base, a variable cylindrical weight positioned between the guide rods, beveled anti-friction rollers journaled in the guide rods and engaging the cylindrical surface of the weight to permit free vertical and rotary movement of the weight, indicating means adjustably secured to the weight to indicate the degree of movement of the weight toward and from the base, and manually operated means to raise the weight from the base.

CHARLES H. DESAUTELS.